United States Patent
Olsen

(10) Patent No.: US 11,649,806 B2
(45) Date of Patent: May 16, 2023

(54) FLOATING WIND TURBINE GENERATOR INSTALLATION

(71) Applicant: Vestas Wind Systems A/S, Aarhus N. (DK)

(72) Inventor: Alf Olsen, Tilst (DK)

(73) Assignee: Vestas Wind Systems A/S, Aarhus N (DK)

(*) Notice: Subject to any disclaimer, the term of this patent is extended or adjusted under 35 U.S.C. 154(b) by 0 days.

(21) Appl. No.: 17/273,482

(22) PCT Filed: Sep. 2, 2019

(86) PCT No.: PCT/EP2019/073339
§ 371 (c)(1),
(2) Date: Mar. 4, 2021

(87) PCT Pub. No.: WO2020/053015
PCT Pub. Date: Mar. 19, 2020

(65) Prior Publication Data
US 2021/0355917 A1  Nov. 18, 2021

(30) Foreign Application Priority Data
Sep. 13, 2018  (EP) .................................... 18194198

(51) Int. Cl.
*F03D 13/25* (2016.01)
*F03D 13/10* (2016.01)
(Continued)

(52) U.S. Cl.
CPC .............. *F03D 13/25* (2016.05); *B63B 1/107* (2013.01); *B63B 35/44* (2013.01); *B63B 75/00* (2020.01);
(Continued)

(58) Field of Classification Search
CPC ......... F03D 13/25; F03D 13/10; B63B 1/107; B63B 35/44; B63B 75/00;
(Continued)

(56) References Cited

U.S. PATENT DOCUMENTS

| 2013/0152840 A1* | 6/2013 | Awashima | ............ | B63B 35/003 114/264 |
| 2014/0216169 A1* | 8/2014 | Romo | ................... | B66B 7/1246 73/862.01 |
| 2016/0160836 A1 | 6/2016 | Liu et al. | | |

FOREIGN PATENT DOCUMENTS

| CN | 101513923 A | 8/2009 |
| CN | 101778757 A | 7/2010 |

(Continued)

OTHER PUBLICATIONS

European Patent Office, Search Report in EP Application No. 18194198.0, dated Mar. 15, 2019.

(Continued)

*Primary Examiner* — Joseph Ortega
(74) *Attorney, Agent, or Firm* — Wood Herron & Evans LLP

(57) ABSTRACT

A method of installing a wind turbine generator onto a floating foundation. The floating foundation has variable buoyancy and is pre-ballasted to float at a predetermined vertical position before installation of a wind turbine generator component onto the floating foundation. A wind turbine generator component supported by lifting equipment is brought towards the floating foundation until contact is made with the floating foundation. Ballast is removed from the floating foundation to increase the buoyancy of the floating foundation such that weight of the wind turbine generator component supported by the floating foundation is increased from substantially zero to substantially the entire weight of the wind turbine generator component. The vertical position of the floating foundation is substantially unchanged during transferring weight of the wind turbine generator component onto the floating foundation.

18 Claims, 11 Drawing Sheets

(51) Int. Cl.
   *B63B 35/44*   (2006.01)
   *B63B 75/00*   (2020.01)
   *B63B 1/10*   (2006.01)

(52) U.S. Cl.
   CPC ........ *F03D 13/10* (2016.05); *B63B 2035/446* (2013.01); *F05B 2240/93* (2013.01); *Y02E 10/72* (2013.01); *Y02E 10/727* (2013.01)

(58) Field of Classification Search
   CPC ........... B63B 2035/446; F05B 2240/93; Y02E 10/72; Y02E 10/727
   See application file for complete search history.

(56) References Cited

FOREIGN PATENT DOCUMENTS

| | | | |
|---|---|---|---|
| CN | 102278291 | A | 12/2011 |
| EP | 2597027 | A1 | 5/2013 |
| GB | 2454585 | A | 5/2009 |
| JP | 2012201219 | A | 10/2012 |

OTHER PUBLICATIONS

European Patent Office, International Search Report and Written Opinion in PCT Application No. PCT/EP2019/073339, dated Oct. 24, 2019.
China National Intellectual Property Administration, First Office Action issued in corresponding Chinese Patent Application No. 201980070709.X, dated Feb. 1,2923 (with English translation).

\* cited by examiner

FLOATING WIND TURBINE GENERATOR INSTALLATION

FIELD OF THE INVENTION

The present invention relates to a system and method of installing a wind turbine generator onto a floating foundation.

BACKGROUND OF THE INVENTION

Offshore wind turbine generators for example for deeper water operation can be mounted to a floating foundation. The floating foundation has buoyancy to support the weight of the wind turbine generator mounted upon it. Various types of floating foundation are known which are coupled to the seabed and stabilised in different ways.

One such floating foundation is a buoyancy stabilised floating foundation of a semi-submersible type. The floating foundation typically has a plurality of stabilising columns including internal volumes for containing water ballast for smaller adjustments of tilt of the foundation. The water ballast may be introduced or removed from the body of water in which the floating foundation is floating. The level, or vertical depth, as well as the tilt attitude of the floating foundation can be adjusted by controlling the buoyancy of each of the stabilising columns by adjusting the amount of water ballast in the columns. The wind turbine generator is typically mounted upon one of the stabilising columns. Other buoyancy stabilised floating foundations are known which take the form of a 'barge'. Buoyancy stabilised floating foundations are typically anchored to the seabed with catenary mooring lines.

Other types of floating foundation are known which are 'ballast stabilised' or 'mooring line stabilised'. These types of floating foundation may still have variable buoyancy for adjusting their floating vertical depth but are typically stabilised in tilt attitude by mooring lines (e.g. tension leg platform with anchors, catenary mooring lines with anchors) and/or by counterweight ballast ('spar buoy' type).

Traditionally, during installation of the wind turbine generator upon the floating foundation, e.g. using a crane, the vertical depth and/or tilt attitude of the floating foundation may change as the weight of the wind turbine generator, or components of the wind turbine generator, are transferred from the crane onto the floating foundation as the crane lowers these onto the floating foundation. Movement of the floating foundation in this way may lead to increased safety risks associated with the installation as changing in vertical position of the foundation may lead to angled lifting with a tension line not being vertical and hence submitting the lifting equipment to forces off the intended axis. Furthermore, it may cause damage to the interface between the floating foundation and the wind turbine generator or the interface between components of the wind turbine generator during the installation. This is particularly the situation when the turbine is positioned off the centre of gravity of the floating foundation.

SUMMARY OF THE INVENTION

A first aspect of the invention provides a method of installing a wind turbine generator onto a floating foundation, comprising: pre-ballasting a floating foundation to float at a predetermined vertical position before installation of a wind turbine generator component onto the floating foundation; bringing a wind turbine generator component towards the floating foundation until direct or indirect contact is made with the floating foundation; and removing ballast from the floating foundation to increase the buoyancy of the floating foundation such that weight of the wind turbine generator component supported by the floating foundation is increased from substantially zero to substantially the entire weight of the wind turbine generator component, wherein the wind turbine generator component is initially supported by lifting equipment and is lowered by the lifting equipment towards the floating foundation and the vertical position of the floating foundation is substantially unchanged during transferring weight of the wind turbine generator component onto the floating foundation.

A further aspect of the invention provides a system for installing a wind turbine generator onto a floating foundation, comprising: a floating foundation having variable buoyancy; lifting equipment for bringing a wind turbine generator component towards the floating foundation until direct or indirect contact is made with the floating foundation; and a controller coupled to a ballast removal device associated with the floating foundation for removing ballast from the floating foundation to increase the buoyancy of the floating foundation such that weight of the wind turbine generator component supported by the floating foundation is increased from substantially zero to substantially the entire weight of the wind turbine generator component, wherein the controller is configured to maintain a vertical position of the floating foundation substantially unchanged during transferring weight of the wind turbine generator component onto the floating foundation.

The 'vertical position' of the floating foundation may be: either with respect to the top surface of the body of water in which the foundation is floating, i.e. a 'vertical depth'; or may be with respect to a fixed ground surface adjacent the body of water in which the foundation is floating, i.e. a 'vertical height'. The fixed ground surface may be a seabed, a vessel jacked up on the sea floor or a quayside, for example. In an enclosed body of water with no variation in the water level then the vertical position may be either the vertical depth or the vertical height, as they will be directly related. However in a tidal or other body of water with a varying water level then the vertical position may be selected as: either the vertical depth, where the position of the foundation with respect to the water level is unchanged but that water level is variable; or the vertical height, where the position of the foundation with respect to the water level changes as the water level changes but the position of the foundation with respect to the ground is unchanged.

The invention is advantageous in that risks associated with movement of the floating platform during installation of the wind turbine component vertically and/or tilting relative to horizontal can be avoided or at least ameliorated. In particular, risks associated with geometrical displacement between the lifting equipment and the floating platform, or risks associated with lifting equipment failure, can be avoided or reduced.

Particularly for installation of very tall wind turbine generators, lifting of wind turbine generator component by lifting equipment, such as a crane or a hoist, is safer than sliding movement for example on a slay or a rolling vehicle due to the high position of the centre of gravity. By very tall wind turbine generators is here meant wind turbine generators with tip height of more than 150 m and particularly for wind turbines with tip height of more than 200 m, such as more than 250 m. Wind turbine generators typically has a tip height of less than 300 m but taller wind turbines may be envisioned in the future, and other lifting equipment like for example an airship will be suitable.

The method may further comprise maintaining the floating foundation at a substantially constant attitude, and optionally tilt just prior to and/or during installation of the wind turbine generator component onto the floating foundation.

The method may further comprise maintaining the floating foundation substantially horizontal prior to and/or during installation of the wind turbine generator component onto the floating foundation.

The steps of bringing a wind turbine generator component towards the floating foundation, and removing ballast from the floating foundation, may be repeated for at least two wind turbine generator components to be connected and preferably each wind turbine generator component of a wind turbine generator.

The wind turbine generator component may be the entire wind turbine generator to be installed onto the floating foundation, e.g. in an installation step of bringing the entire wind turbine generator towards the floating foundation and removing ballast from the floating foundation.

Pre-ballasting the floating foundation to float at a predetermined vertical position may include setting the vertical position to an expected final vertical position once all components of the wind turbine generator have been installed onto the floating platform.

The ballast may be water ballast.

The method may further comprise connecting the wind turbine generator component to the floating foundation once contact is made to substantially prevent lateral displacement of the wind turbine generator component relative to the floating foundation before removing ballast from the floating foundation equivalent to at least 5% of the weight of the wind turbine generator component, and preferably before removing any ballast from the floating foundation.

The method may further comprise securing the wind turbine generator component to the floating foundation to substantially prevent vertical displacement of the wind turbine generator component relative to the floating foundation after removing ballast from the floating foundation.

The lifting equipment may be a crane, or a hoist, preferably the lifting equipment includes a tension line, such as a crane cable.

The wind turbine generator component may be initially supported by the lifting equipment by one or more tension lines, and the method may further comprise paying out the one of more tension lines to offset or at least partially compensate a retraction in the tension line(s) as tension in the tension line(s) is reduced during transferring weight of the wind turbine generator component onto the floating foundation.

The mass of ballast removed may not exactly match the mass of the of the wind turbine generator component being installed onto the floating platform. This may account for a difference between the centre of gravity of the ballast and the centre of gravity of the wind turbine generator component being installed.

The vertical position may be taken with respect to either the top surface of the body of water in which the foundation is floating, or with respect to a fixed ground surface adjacent the body of water in which the foundation is floating.

The method may further comprise adding or removing ballast from the floating foundation to account for dynamic water level variation, such as tidal variation and/or wind related variation.

The system may further comprise at least one sensor selected from a tilt sensor and/or a level sensor and/or a pressure sensor coupled to the controller. The floating foundation may include the at least one sensor. Additionally, or alternatively, the lifting equipment or the wind turbine generator component may include the at least one sensor.

The controller may be configured for adjusting the buoyancy of the floating foundation such that the attitude and optionally the tilt of the floating foundation is substantially unchanged during transferring weight of the wind turbine generator component onto the floating foundation.

The wind turbine generator component may be initially connected to the lifting equipment by one or more tension lines. The system may further comprise a load sensor coupled to the tension line(s) and to the controller.

The lifting equipment may be land based, or may be floating, e.g. supported by a floating vessel.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
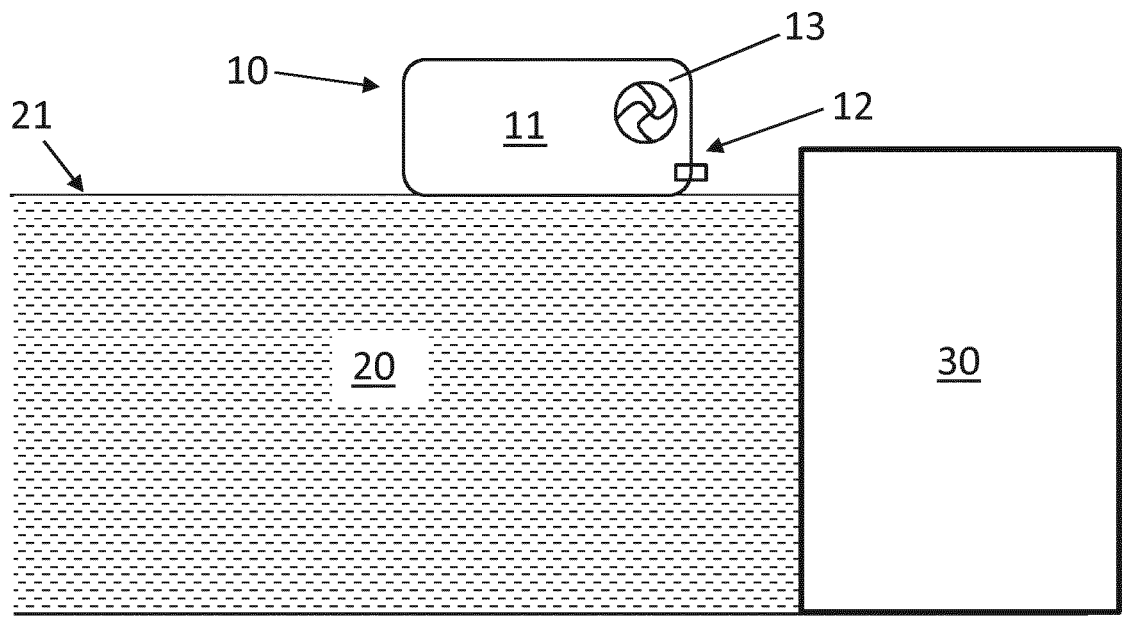
FIG. 1 shows a floating foundation empty of water ballast adjacent a quayside.

FIG. 1 shows a floating foundation 10 floating on the surface 21 of a body of water 20 adjacent a quayside 30. The floating foundation 10 has an internal volume 11 for containing a quantity of ballast. In an example the ballast is water ballast. The internal volume 11 of the floating foundation 10 is in selective fluid communication with the body of water 20 via a port 12 of the floating foundation 10. A pump 13 is arranged to pump water ballast either out from the internal volume 11 through the port 12, or through the port 12 into the internal volume 11. In doing so, the quantity of water ballast in the internal volume 11 is variable such that the floating foundation 10 has variable buoyancy.

Figure 2:
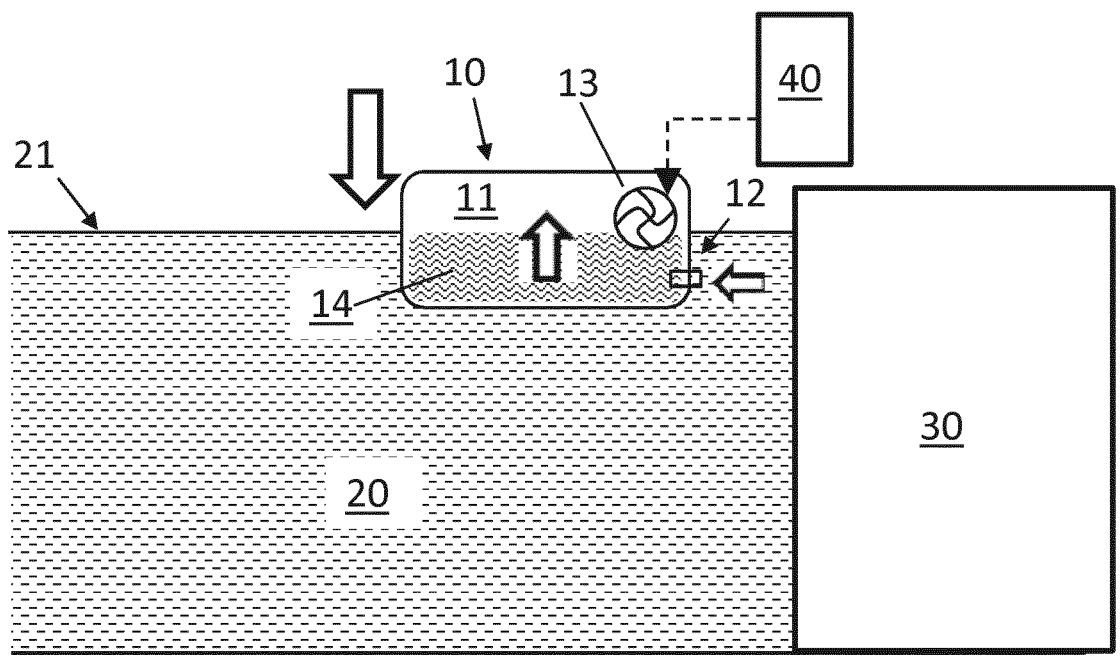
FIG. 2 shows the floating foundation filled with water ballast to a predetermined vertical position prior to installation of a wind turbine generator.

As shown in FIG. 2, a controller 40 is coupled with the pump 13. Under the action of the controller 40 the pump 13 is filling the internal volume 11 of the floating foundation 10 with water ballast 14 by drawing water from the body of water 20 in through the port 12 such that the amount of water ballast 14 is increasing and the vertical position of the floating foundation 10 is decreasing in depth relative to the surface 21 of the body of water 20. This operation is continued until the floating foundation 10 reaches a predetermined vertical position. In a static body of water with a constant water level the vertical position is taken relative to the surface 21 of the body of water 20 but may equally be taken with respect to a fixed ground surface. In a dynamic body of water with a dynamic water level, the vertical position may be taken with respect to either the surface of the body of water, or with respect to the fixed ground surface. The floating foundation is said to be 'pre-ballasted' at this predetermined vertical position.

In an example, this predetermined vertical position is selected as the final intended vertical depth of the floating foundation 10 once a wind turbine generator has been installed upon the floating foundation. However, any vertical position may be selected.

Figure 3:
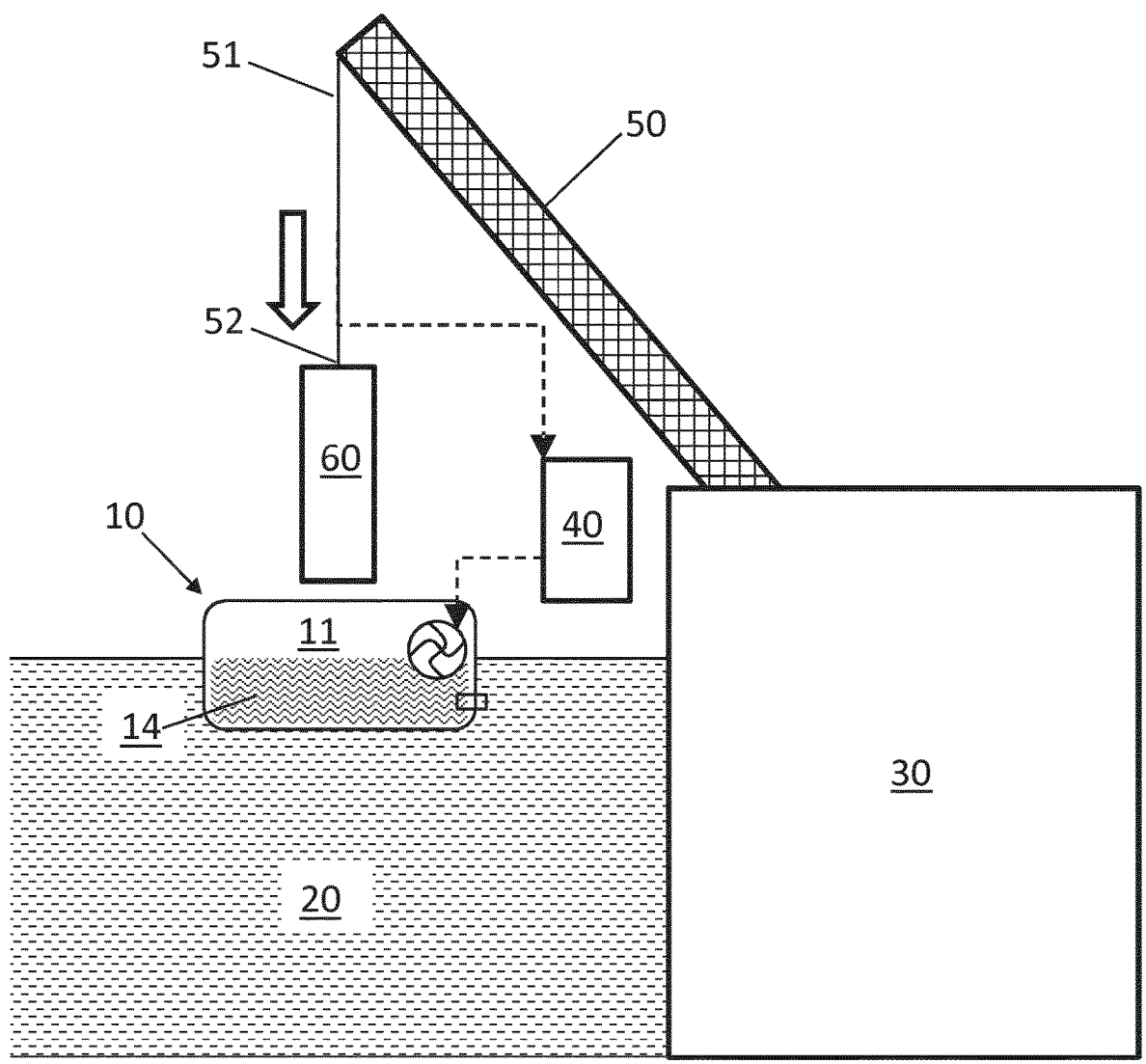
FIG. 3 shows the floating foundation at the predetermined vertical position as a wind turbine component is lowered by lifting equipment towards the floating foundation.

FIG. 3 shows lifting equipment 50 mounted upon the quayside 30. The lifting equipment 50 may for example be a crane for movement in multiple directions and for lifting and lowering, or may be a hoist for lifting and lowering vertically only. The lifting equipment 50 includes a tension line 51, such as a crane cable, attached to a distal end of the lifting equipment 50 and which may be reeled in or paid out so as to raise and lower an attachment point 52 for coupling to a load. As illustrated in FIG. 3 the attachment point 52 of the lifting equipment 50 is coupled to a wind turbine generator component 60.

The wind turbine generator component may be a first one of a plurality of sections of a wind turbine generator to be installed upon the floating foundation 10, or may be an entire wind turbine generator to be installed upon the floating foundation 10. In the illustrated example the wind turbine component 60 is the first one of a plurality of wind turbine generator components, e.g. a first tower section. A tension in the tension line 51 is measured. This measurement may be a direct measurement, e.g. of strain, in the tension line 51 or may be an indirect measurement through the lifting equipment 50 more generally. A signal indicative of the tension in the tension line 51 is communicated to the controller 40.

The wind turbine generator component 60 is lowered towards the floating foundation 10 until contact is made between the lower end of the wind turbine component 60 and an upper attachment interface 15 of the floating foundation 10. Contact between the wind turbine component 60 and the upper attachment interface 15 of the floating foundation 10 is sensed and this contact is communicated to the lifting equipment 50 to stop paying out the tension line 51.

The contact between the wind turbine generator component 60 and the upper attachment interface 15 of the floating foundation may be signalled in a variety of ways. For example, a contact sensor in the vicinity of the upper attachment interface 15 of the floating foundation may detect the contact with the wind turbine generator component 60. Alternatively, a sensor on the floating foundation 10 may detect any slight variation in the vertical position of the floating foundation 10 from the predetermined vertical position. Alternatively, any change in the load supported by the lifting equipment 50 which deviates from the load of the fully suspended wind turbine generator component 60 may be detected. These various contact sensing schemes may be used alone or in combination and are given as purely illustrative examples from a non-exhaustive list and further alternatives will be appreciated by those skilled in the art. The lowering of the wind turbine generator component 60 is stopped once contact is made with the floating foundation 10 so as to substantially prevent any change in the vertical position of the floating foundation 10 in the body of water 20.

Once contact is made between the wind turbine generator component 60 and the upper attachment interface 15 the wind turbine generator component 60 is connected to the floating foundation 10. This connection may be made using locating pins or bolts 16. This connection is made to substantially prevent lateral displacement of the wind turbine generator component 60 relative to the floating foundation 10 before removal of ballast water 14. Preferably the connection is made to substantially prevent lateral displacement of the wind turbine generator component 60 relative to the floating foundation 10 before removing water ballast 14 from the floating foundation 10 equivalent to at least 5% of the weight of the wind turbine generator component 60. Alternatively, this connection may be made before removing any of the water ballast 14 from the floating foundation 10 after contact with the wind turbine generator component 60.

Figure 5:
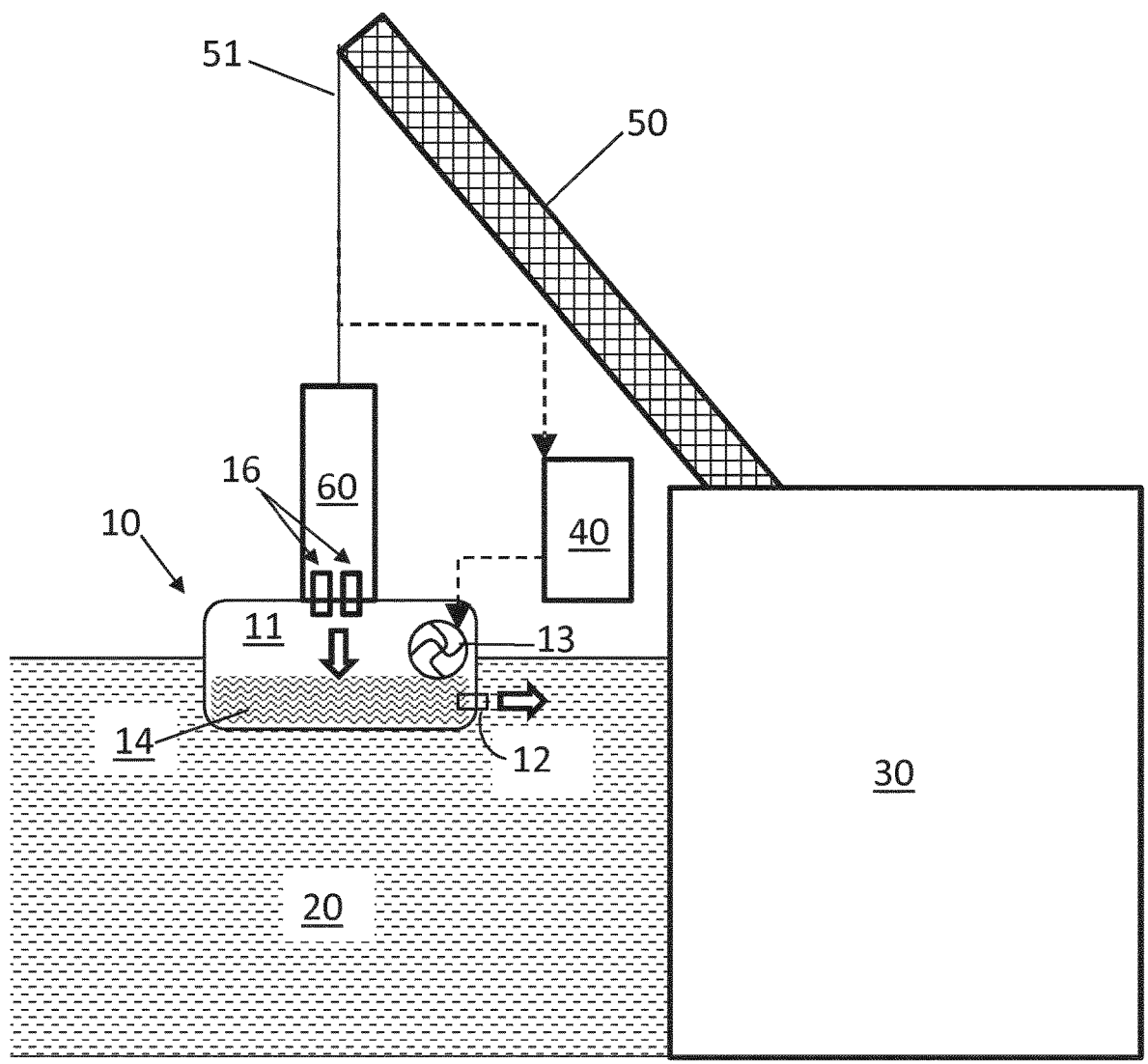
FIG. 5 shows the floating foundation with decreasing water ballast to increase the buoyancy of the floating foundation so as to transfer the load of the wind turbine component from the lifting equipment onto the floating foundation without changing the vertical position of the floating foundation.

As shown in FIG. 5 the buoyancy of the floating foundation 10 is then increased. The buoyancy of the floating foundation 10 is increased by reducing the amount of the ballast water 14 within the floating foundation 10. The ballast water 14 may be removed using the pump 13 under the action of the controller 40 so as to displace the ballast water 14 from the internal volume 11 through the port 12 and into the body of water 20. As the buoyancy of the floating foundation 10 is increased the load of the wind turbine generator component 60 is gradually transferred from the lifting equipment 50 on to the floating foundation 10. In this way, instead of lowering loads onto the floating foundation, the floating foundation is "lifted" until substantially the entire weight of the wind turbine generator component 60 is supported by the floating foundation 10. During this load transfer of the wind turbine generator component 60 on to the floating foundation 10 the vertical position of the floating foundation 10 remains substantially unchanged.

The increase in buoyancy of the floating foundation 10 by removal of water ballast 14 from the floating foundation 10 continues until the floating foundation 10 supports substantially the entire weight of the wind turbine generator component 60, at which point the controller 40 controls the water pump 13 to stop removing water ballast 14 from the floating foundation 10.

Completion of the transfer of the load of the wind turbine generator component 60 onto the floating foundation 10 may be sensed in a variety of ways. For example, the tension in the tension line 51 may be monitored until it is judged that the lifting equipment 50 is no longer supporting substantially any of the weight of the wind turbine generator component 60. Alternatively, monitoring the vertical position of the floating foundation 10 may be used to indicate any slight change in the vertical position of the floating foundation 10, indicating that a further offloading of water ballast 14 will cause an increase in buoyancy to adjust the vertical position of the floating foundation 10 away from the predetermined vertical position. It will be understood that these examples of determining when transfer of the load of the wind turbine generator component 60 so as to be fully supported by the floating foundation 10 are purely illustrative examples of a non-exhaustive list and other determination means will be appreciated by those skilled in the art.

When the tension line 51 is supporting the weight of the wind turbine generator component 60 it may be expected that the tension line 51 may extend elastically under load. As this load is reduced it can be expected that this extension of the tension line 51 will reduce and so it may be appropriate to cause the lifting equipment 50 to pay out the tension line 51 by a small amount just sufficient to offset this retraction in the tension line as tension in the tension line 51 is reduced during transferring weight of the wind turbine generator component 60 onto the floating foundation 10.

Once substantially the entire weight of the wind turbine generator component 60 has been transferred onto the floating foundation 10 the connections 16 are finally tightened to substantially prevent vertical displacement of the wind turbine generator component 60 relative to the floating foundation 10. Where the connections 16 were initially locating pins, the locating pins may be removed and replaced with bolts which are subsequently torque tightened. Where the connections 16 were bolts, these may be left in situ and torque tightened. It is beneficial that the connections 16 prevent only lateral displacement and not also vertical displacement of the wind turbine generator component 60 relative to the floating foundation 10 whilst the buoyancy of the floating foundation 10 is being increased, and that the connections 16 prevent both lateral and vertical displacement of the wind turbine generator component 60 relative to the floating foundation 10 once some of the water ballast 14 has been removed from the floating foundation such that the entire weight of the wind turbine generator component 60 has been transferred onto the floating foundation.

Figure 6:
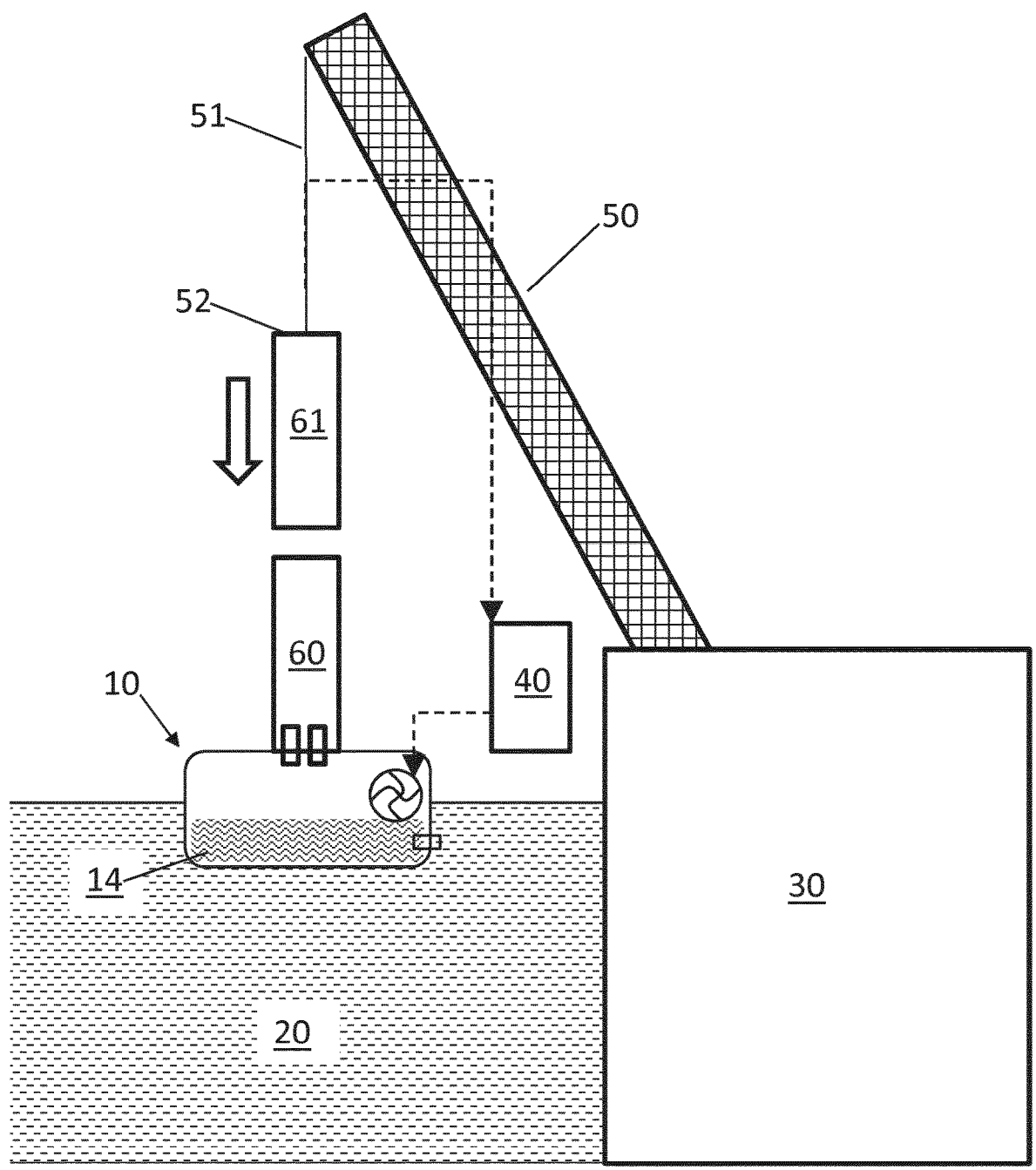
FIG. 6 shows the floating foundation still at the predetermined vertical position as a second wind turbine component is lowered by the lifting equipment towards the floating foundation.

FIG. 6 illustrates a near repeat of the process above with reference to FIG. 3 but in which a second wind turbine generator component 61 is connected to the attachment point 52 of the lifting equipment 50. The second wind turbine generator component 61 is lowered as before towards the floating foundation until contact is made between a lower end of the second wind turbine generator component 61 and an upper end of the first wind turbine generator component 60 already installed on the floating foundation 10. As before, the buoyancy of the floating foundation 10 remains substantially constant such that the vertical position of the floating foundation 10 is at a predetermined vertical position during lowering of the second wind turbine generator component 61. This predetermined vertical position of the floating foundation 10 may be the same as that selected during the installation of the first wind turbine generator component 60, or may be different. Preferably, the same predetermined vertical position of the floating foundation 10 is selected through installation of all of the wind turbine generator components.

Figure 4:
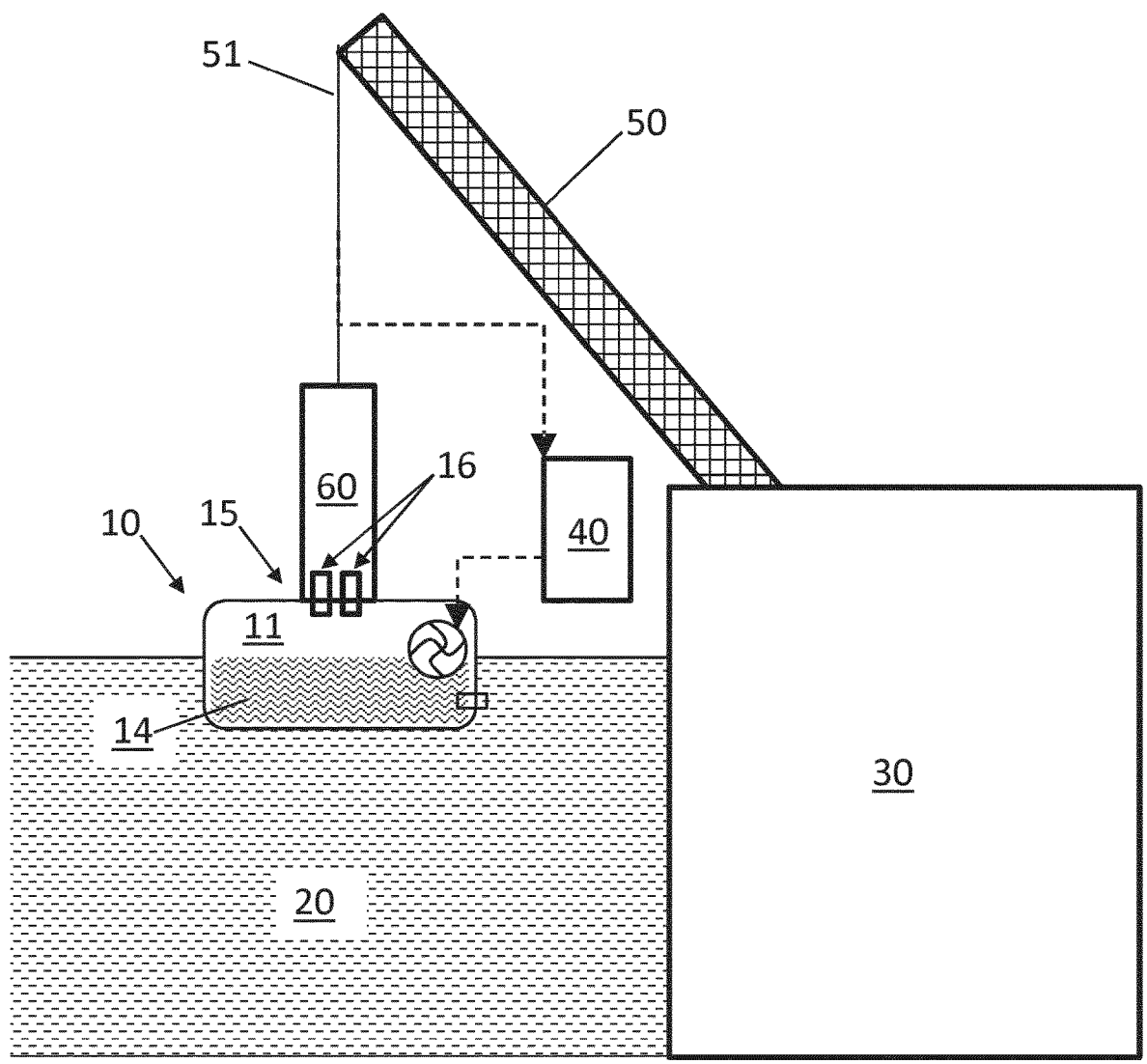
FIG. 4 shows the floating foundation at the predetermined vertical position as the wind turbine component just makes contact with the floating foundation.
Figure 7:
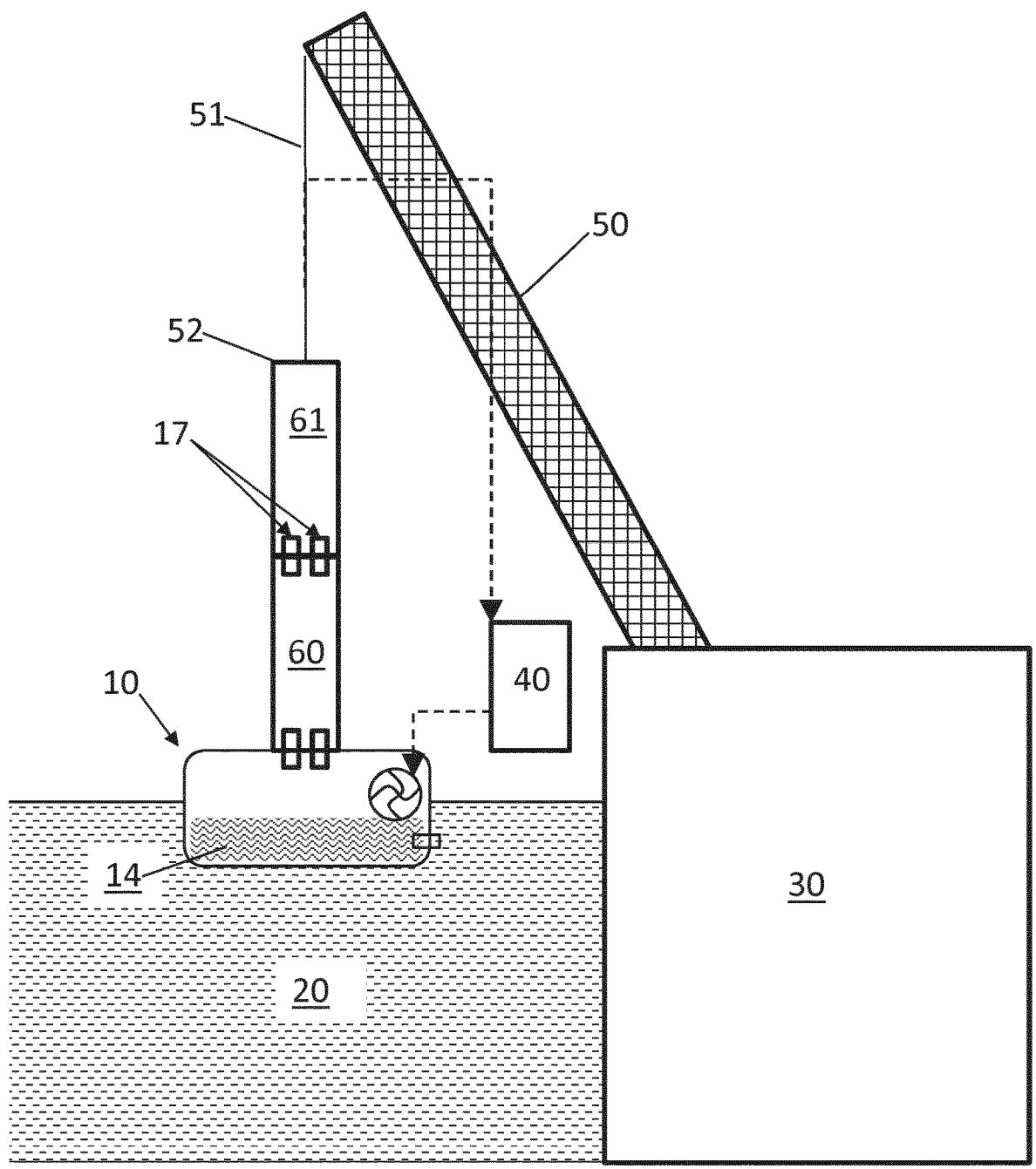
FIG. 7 shows the floating foundation still at the predetermined vertical position as the second wind turbine component just makes contact with the first installed wind turbine component upon the floating foundation.

FIG. 7 shows the step in the installation sequence substantially the same as that described above with reference to FIG. 4 but in which the second wind turbine generator component 61 just makes contact with the first wind turbine generator component 60 already installed on the floating foundation 10. Once contact is made between the second wind turbine generator component 61 and the first wind turbine generator component 60 connections 17 are installed between the first and second wind turbine generator components 60, 61 in a substantially identical manner to the installation of the connections 16 described previously.

Figure 8:
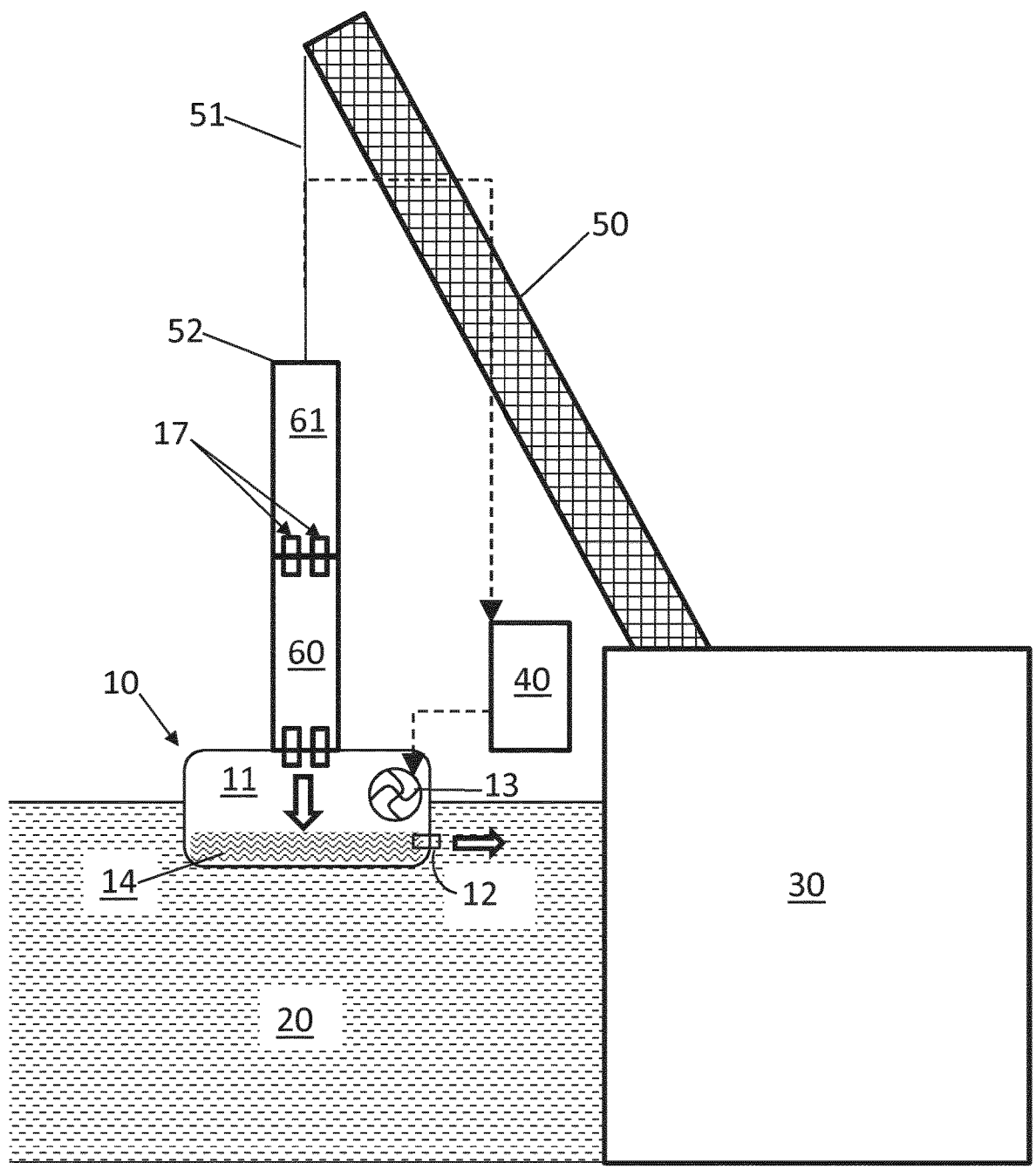
FIG. 8 shows the floating foundation with decreasing water ballast to increase the buoyancy of the floating foundation so as to transfer the load of the second wind turbine component from the lifting equipment onto the floating foundation without changing the vertical position of the floating foundation.

FIG. 8 illustrates a step in the installation sequence similar to that described above with reference to FIG. 5 but in which the load of the second wind turbine generator component 61 is transferred from the lifting equipment 50 onto the floating foundation 10 by increasing the buoyancy of the floating foundation 10 by removing water ballast 14 from the floating foundation 10. As before, the controller 40 controls the water pump 13 to eject some of the water ballast 14 from the internal volume 11 of the floating foundation 10 through the port 12 and into the body of water 20. This continues until substantially the entire weight of the second wind turbine generator component 61 has been transferred onto the floating foundation 10. The vertical position of the floating foundation 10 is substantially unchanged during transferring of weight of the second wind turbine generator component 61 onto the floating foundation 10, as before.

Figure 9:
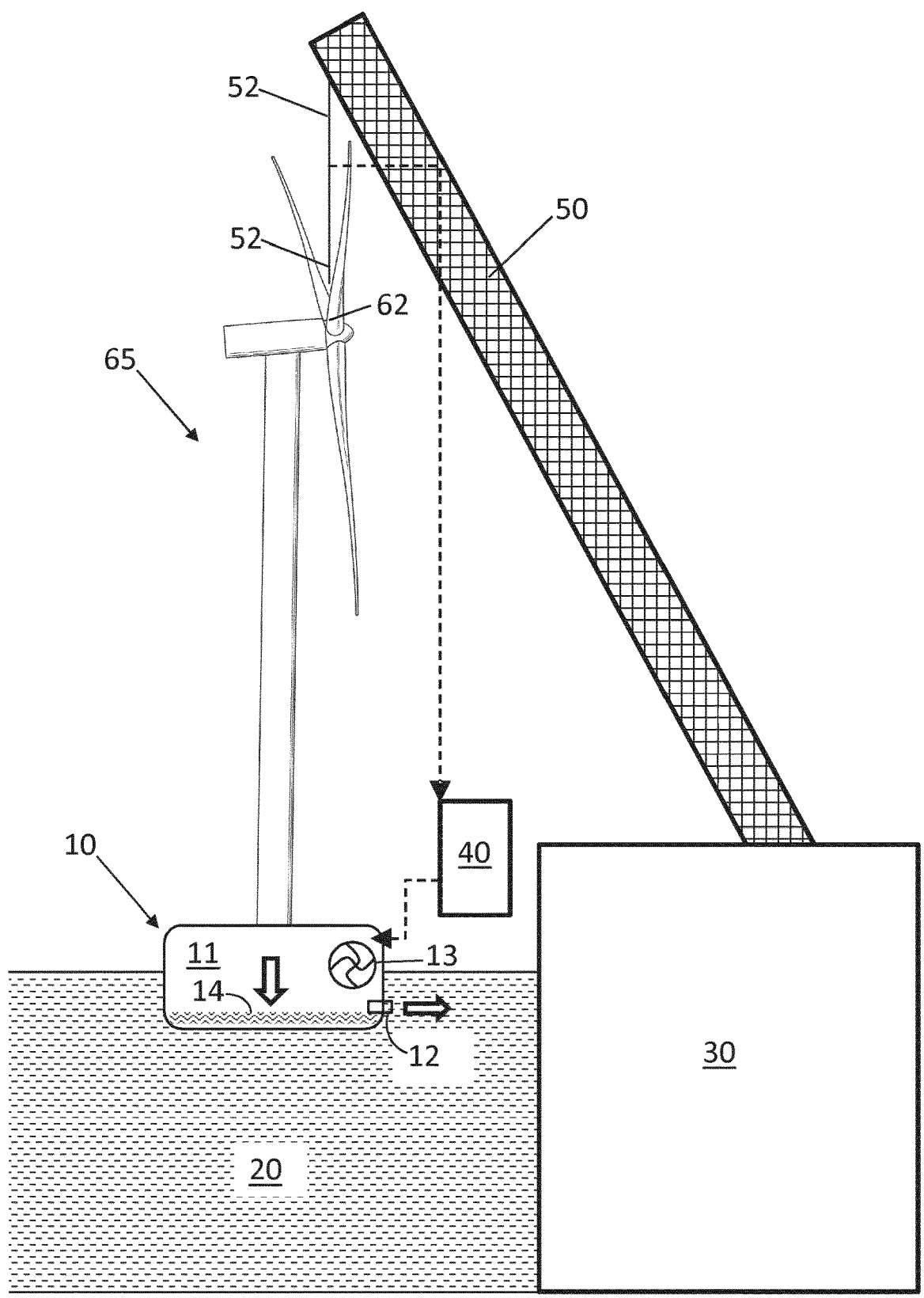
FIG. 9 shows the floating foundation with decreasing water ballast to increase the buoyancy of the floating foundation so as to transfer the load of the final wind turbine component from the lifting equipment onto the floating foundation without changing the vertical position of the floating foundation.

FIG. 9 illustrates a step in the installation sequence similar to that described above with reference to FIG. 8 but in which the final wind turbine generator component 62 is being installed onto the floating foundation 10 to complete the installation of a wind turbine generator 65 onto the floating foundation 10. As before, the buoyancy of the floating foundation 10 is increased by removal of water ballast 14 until substantially the entire weight of the final wind turbine generator component 62 is supported by the floating foundation 10. The vertical position of the floating foundation 10 is substantially unchanged during transferring weight of the final wind turbine generator component 62 onto the floating foundation 10.

Figure 10:
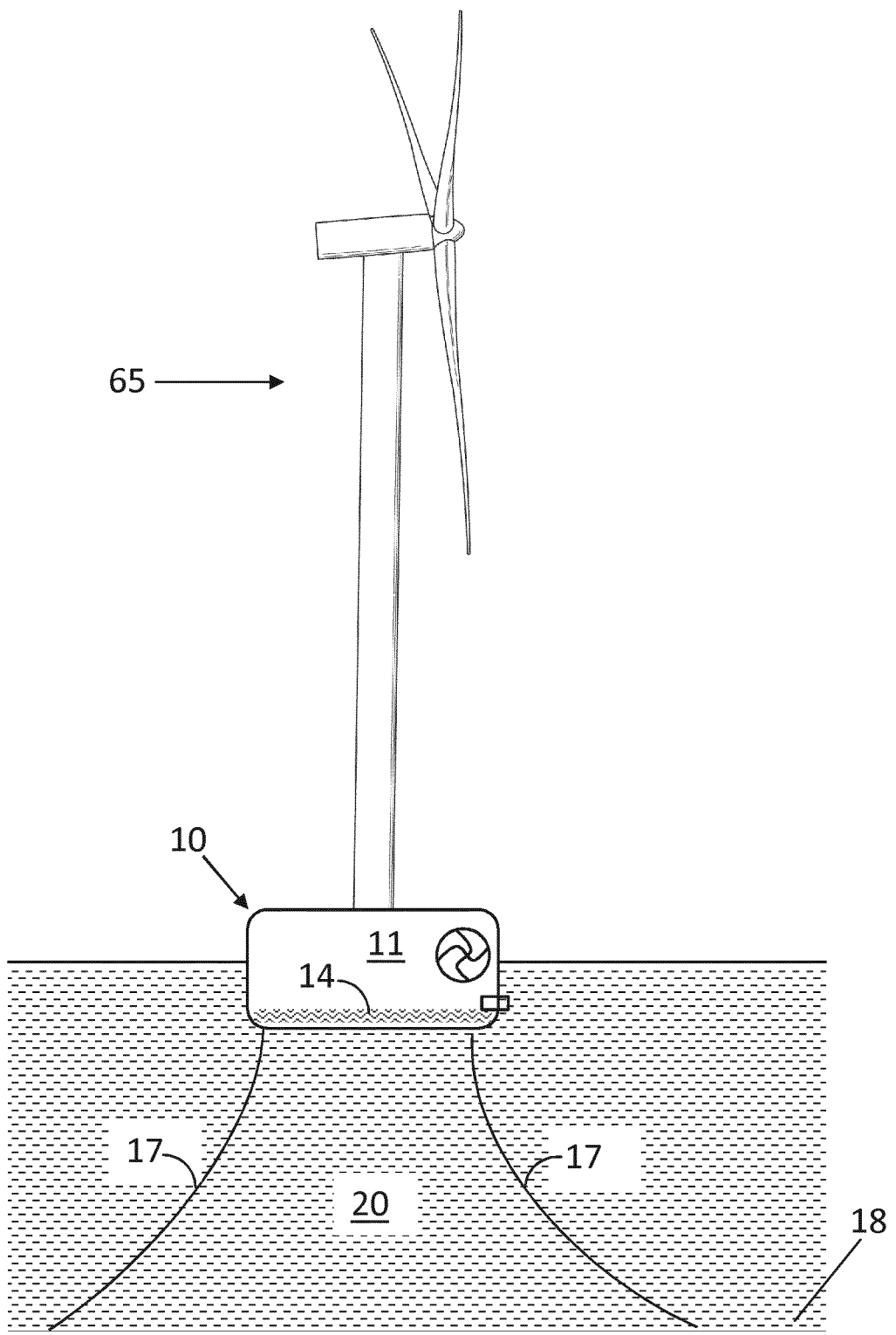
FIG. 10 shows the completed wind turbine generator mounted upon the floating foundation still at the predetermined vertical position and anchored to the seabed with catenary mooring lines.

As shown in FIG. 10 once the complete wind turbine generator 65 has been installed upon the floating foundation 10 the floating foundation 10 having the wind turbine generator 65 installed thereon may be towed by a vessel from the quayside 30 to a desired wind turbine generator operating location. The floating foundation 10 may be secured to the seabed 18 by catenary cables 17. It is to be noted that the vertical position of the semi-submersible floating foundation 10 may be the same or different to the vertical position of the floating foundation 10 during installation of the wind turbine generator 65 onto the floating foundation.

It will be appreciated that although in the examples described above with reference to FIGS. 1-10 the floating foundation is described in relation to a semi-submersible platform, the floating foundation may be fully submersed in the body of water 20. Furthermore, whilst the floating foundation 10 is shown in FIG. 10 secured to the seabed 18 with catenary mooring lines 17, the floating foundation may be secured and stabilised using a variety of known systems, e.g. by a tension leg platform with anchors.

Furthermore, in an example where the body of water in which the foundation is floating is tidal, the water level will be dynamic. It may be desirable to maintain the vertical position of the floating foundation substantially constant with respect to the quayside 30, or other fixed ground surface, during installation of the wind turbine generator where the water level is dynamic. Ballast may be added or removed from the foundation to account for the variation in the dynamic water level. This ballast variation may be performed alongside the ballast removal to account for the transfer of load during installation of the wind turbine generator. An advantage of keeping the vertical position of the floating foundation constant with respect to the fixed ground surface to account for the dynamic water level is that the lifting equipment 50 then does not need to be adjusted to accommodate for the dynamic water level. Alternatively, the vertical position of the floating foundation can be maintained substantially constant with respect to the water level, even though the water level is dynamic with respect to the fixed ground surface. The lifting equipment 50 can then be controlled to accommodate for the dynamic water level, e.g. by adjusting the length of the tension line/crane cable length. If the dynamic water level is due to tidal variation, a look up table of tidal height or dynamic water level modelling may be used in either case. Alternatively, a vertical position sensor system may be used for establishing the dynamic water level with respect to the fixed ground surface to determine the tidal height. The sensor system may be preferable as this could accommodate water level variations due to weather, e.g. storms, as well as predictable tidal effects. In one embodiment, the need for dynamic water level compensation could be overcome by keeping the water level constant by using a dam or lock arrangement.

Figure 11:
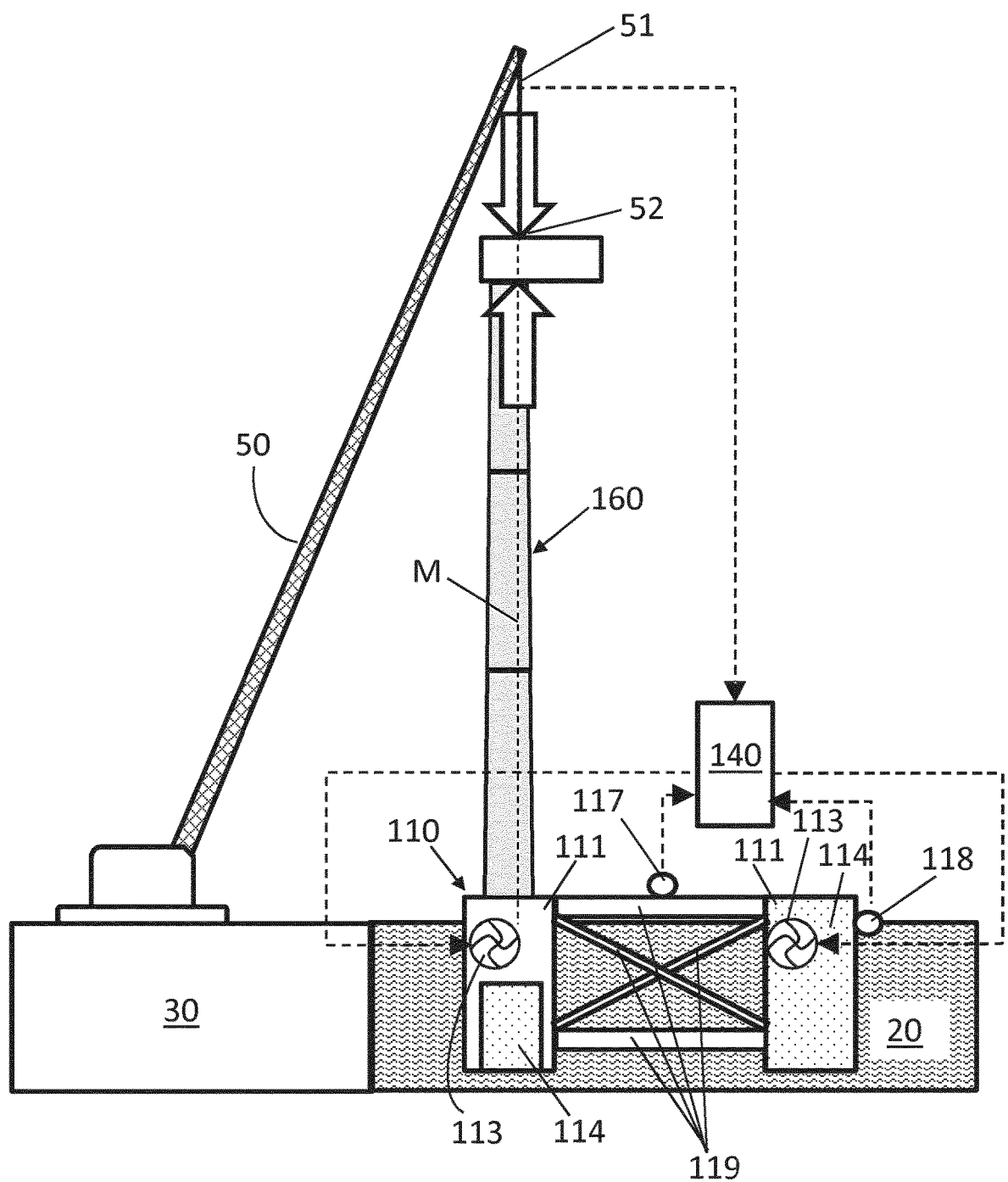
FIG. 11 shows another floating foundation of the semi-submersible type with multiple stabilising columns and a tilt level sensing control system.

FIG. 11 illustrates a further example of a floating foundation 110 having a plurality of stabilising columns including internal volumes 111 for containing ballast water 114. Each stabilising column has a water pump 113 for controlling an amount of water ballast 114 in the respective internal volumes 111 of the stabilising columns. The stabilising columns are connecting by cross beams 119. The water pumps 113 are coupled to a controller 140. The floating foundation 110 has a level sensor 118 for sensing the vertical position of the floating foundation 110 in the body of water 20 and a tilt attitude sensor 117 for sensing the tilt attitude of the floating foundation 110. The sensors 117, 118 are coupled to the controller 140. It is preferred that the components of the wind turbine generator are mounted upon one of the stabilising columns. Preferably the floating foundation 110 has three stabilising columns although any number of stabilising columns may be used.

The components of the wind turbine generator 160 are installed upon the floating foundation 110 in a substantially identical manner to that described above with reference to FIGS. 1-10. Beneficially, since the floating foundation 110 has a plurality of internal volumes 111 for containing the water ballast 114 not only the vertical position but also the tilt attitude of the floating foundation 110 can be controlled during installation of the wind turbine generator components onto the floating foundation 110. Removing or increasing the amount of water ballast 114 in any of the plurality of the internal volumes 111 under the action that the controller 140 and the water pumps 113 enables control of both the vertical position and tilt attitude of the floating foundation 110. In this way the floating foundation 110 may be maintained at a substantially constant tilt attitude just prior to and/or during installation of the wind turbine generator component (s) onto the floating foundation. For example, the floating foundation 110 may be maintained at a substantially horizontal attitude prior to and/or during installation of the wind turbine generator components (s) onto the floating foundation 110.

It is commonly found that wind turbine generators are designed with a rotor tilt angle such that the rotor shaft is inclined with respect to the horizontal. This rotor tilt angle may typically be around 6°. It may therefore be beneficial to set the floating foundation 110 at a tilt attitude offset from the horizontal for installation of the rotor, nacelle or other components of the wind turbine generator. It may be desirable to keep the floating foundation 110 substantially horizontal during installation of the tower components and then incline the floating foundation at a tilt angle for installation of the nacelle or rotor components before returning the floating foundation to a substantially horizontal attitude, e.g. before towing the floating foundation out to its desired operating location.

Whilst in the example described above with reference to FIG. 11 the level sensor 118 and the tilt attitude sensor 117 are shown mounted on the floating foundation 110 it will be appreciated that these and other sensors may be provided, and the sensors need not be located on the floating foundation. In a preferred example a plurality of pressure sensors any be provided on the floating foundation or integrated into the floating foundation, e.g. at an interface with the base of the wind turbine generator to be installed on the floating foundation. Alternatively, the sensor may be installed or integrated in the lifting equipment or in the wind turbine generator component to be installed.

As can be seen from FIG. 11, broken line 'M' indicates generally the centre of mass of the wind turbine generator 160 and this may be offset or significantly offset from a centre of buoyancy of the floating foundation 110 alone when the amount of water ballast 114 in each of the internal volumes 111 is identical. Therefore, it is to be expected that in order to maintain the floating foundation 110 substantially horizontal, or at some other preferred tilt attitude, the amount of water ballast 114 in the internal volumes 111 of the floating foundation 110 may be dissimilar. The mass of ballast water 114 removed may therefore not exactly match the mass of the wind turbine generator component being installed on to the floating platform to account for a difference between the centre of gravity of the ballast and the centre of gravity of the wind turbine generator component being installed.

Figure 12:
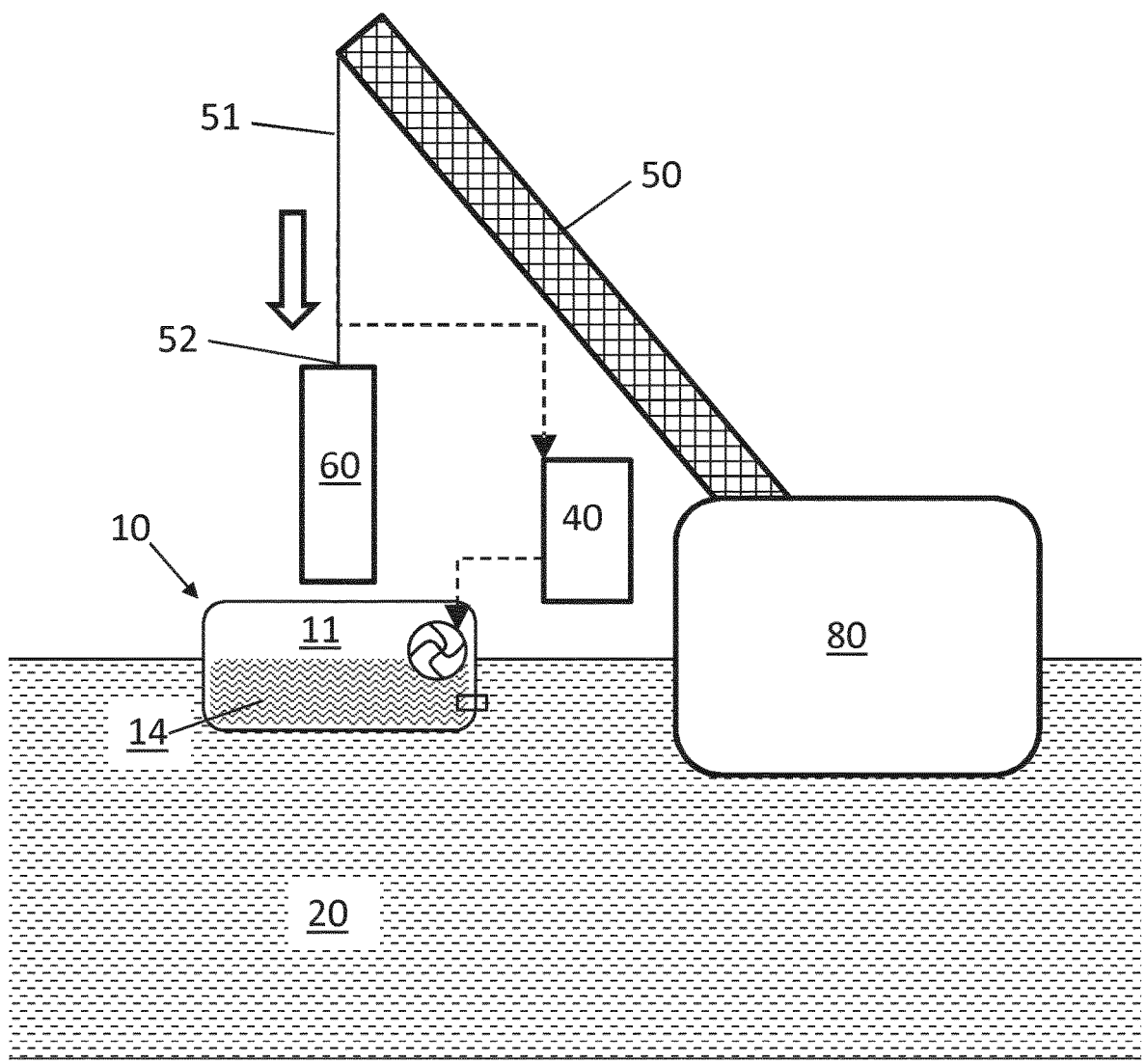
FIG. 12 shows an example of use of floating lifting equipment for installation of the wind turbine generator onto the floating platform.

FIG. 12 illustrates a further example in which the installation of the wind turbine generator or wind turbine generator components onto the floating foundation 10 is performed with lifting equipment 50 mounted, not to a quayside 30 as in FIG. 1, but to a floating vessel 80 positioned adjacent the floating foundation 10. In this way, installation of the wind turbine generator onto the floating foundation may be performed nearer the site of intended operation of the wind turbine generator, e.g. away from shore. In a further alternative example, the lifting equipment 50 may be mounted to a jack-up vessel.

Whilst in the above examples the wind turbine generator is described as being installed as a plurality of wind turbine generator components, in a further example an entire wind turbine generator may be constructed and brought into contact with the floating foundation as an entire wind turbine generator for installation on the floating foundation the steps of the installation however remain unchanged regardless of whether one component, a plurality of components, or an entire wind turbine generator are being installed onto the floating foundation.

In the above described examples, the floating foundation has variable buoyancy using water ballast, however it will be appreciated that other types of ballast may be used so long as a ballast may be added and removed from the floating foundation. For example, solid ballast weights, e.g. concrete or stones, may be loaded and offloaded to/from the floating foundation to vary the buoyancy of the floating foundation. However, water is preferred as it allows for a smooth change in buoyance.

Although the invention has been described above with reference to one or more preferred embodiments, it will be appreciated that various changes or modifications may be made without departing from the scope of the invention as defined in the appended claims.

The invention claimed is:

1. A method of installing a wind turbine generator onto a floating foundation, comprising:
    adjusting ballast in an internal volume of a floating foundation so that the floating foundation floats at a predetermined vertical position before installing a wind turbine generator component onto the floating foundation;
    lowering a wind turbine generator component supported by lifting equipment towards the floating foundation until contact is made with the floating foundation such that the weight of the wind turbine generator component is transferred to the floating foundation as the lifting equipment further lowers the wind turbine generator component onto the floating foundation; and
    removing ballast from the floating foundation to increase the buoyancy of the floating foundation as the weight of the wind turbine generator component is transferred to the floating foundation from substantially zero to substantially the entire weight of the wind turbine generator component,
    wherein the predetermined vertical position of the floating foundation is substantially unchanged as the wind turbine generator component is lowered onto the floating foundation and the weight of the wind turbine generator component is transferred onto the floating foundation.

2. The method according to claim 1, further comprising maintaining the floating foundation at a substantially constant attitude just prior to and/or during installation of the wind turbine generator component onto the floating foundation.

3. The method according to claim 1, further comprising maintaining the floating foundation substantially horizontal prior to and/or during installation of the wind turbine generator component onto the floating foundation.

4. The method according to claim 1, wherein the steps of lowering a wind turbine generator component towards the floating foundation, and removing ballast from the floating foundation are repeated for at least two and preferably for each wind turbine generator component of a wind turbine generator, or wherein the wind turbine generator component is the entire wind turbine generator to be installed onto the floating foundation.

5. The method according to claim 1, wherein pre-ballasting the floating foundation to float at a predetermined vertical position includes setting the vertical position to an expected final vertical position once all components of the wind turbine generator have been installed onto the floating foundation.

6. The method according to claim 1, further comprising connecting the wind turbine generator component to the floating foundation once contact is made to substantially prevent lateral displacement of the wind turbine generator component relative to the floating foundation before removing ballast from the floating foundation equivalent to at least 5% of the weight of the wind turbine generator component, and preferably before removing any ballast from the floating foundation.

7. The method according to claim 6, further comprising securing the wind turbine generator component to the floating foundation to substantially prevent vertical displacement of the wind turbine generator component relative to the floating foundation after removing ballast from the floating foundation.

8. The method according to claim 1, wherein the lifting equipment is a crane, or a hoist, preferably the lifting equipment includes a tension line, such as a crane cable.

9. The method according to claim 1, wherein the wind turbine generator component is initially supported by the lifting equipment by one or more tension lines, and further comprising paying out the one of more tension lines to offset or at least partially compensate a retraction in the tension line(s) as tension in the tension line(s) is reduced during transferring weight of the wind turbine generator component onto the floating foundation.

10. The method according to claim 1, wherein the mass of ballast removed does not exactly match the mass of the wind turbine generator component being installed onto the floating platform to account for a difference between the centre of gravity of the ballast and the centre of gravity of the wind turbine generator component being installed.

11. The method according to claim 1, wherein the vertical position is taken with respect to either the top surface of the body of water in which the floating foundation is floating, or with respect to a fixed ground surface adjacent the body of water in which the floating foundation is floating.

12. The method according to claim 1, further comprising adding or removing ballast from the floating foundation to account for dynamic water level variation.

13. A system for installing a wind turbine generator onto a floating foundation, comprising:
    a floating foundation having variable buoyancy;
    lifting equipment for lowering a wind turbine generator component towards the floating foundation until contact is made with the floating foundation such that the weight of the wind turbine generator component is transferred to the floating foundation as the lifting equipment further lowers the wind turbine generator component onto the floating foundation; and
    a controller coupled to a ballast removal device associated with the floating foundation and configured to remove ballast from the floating foundation to increase the buoyancy of the floating foundation as the weight of the wind turbine generator component is transferred to the floating foundation from substantially zero to substantially the entire weight of the wind turbine generator component,
    wherein the controller is configured to adjust ballast in an internal volume of the floating foundation so that the floating foundation floats at a predetermined vertical position before installing a wind turbine generator component onto the floating foundation, and
    wherein the controller is configured to maintain a vertical position of the floating foundation substantially unchanged as the wind turbine generator component is lowered onto the floating foundation and the weight of the wind turbine generator component is transferred onto the floating foundation.

14. The system according to claim 13, further comprising at least one sensor selected from a tilt sensor and/or a level sensor and/or a pressure sensor coupled to the controller, preferably the floating foundation includes the at least one sensor.

15. The system according to claim 13, wherein the controller is configured for adjusting the buoyancy of the floating foundation such that the attitude of the floating foundation is substantially unchanged during transferring weight of the wind turbine generator component onto the floating foundation.

16. The system according to claim 13, wherein the wind turbine generator component is initially connected to the lifting equipment by one or more tension lines, and further comprising a load sensor coupled to the tension line(s) and to the controller.

17. The system according to claim 13, wherein the lifting equipment is floating or is supported by a floating vessel.

18. A method of installing a wind turbine generator onto a floating foundation, comprising:
   adjusting ballast in an internal volume of a floating foundation so as to move the floating foundation to a predetermined vertical position before installing a wind turbine generator component onto the floating foundation;
   lowering a wind turbine generator component supported by lifting equipment towards the floating foundation until contact is made with the floating foundation such that the weight of the wind turbine generator component is transferred to the floating foundation as the lifting equipment further lowers the wind turbine generator component onto the floating foundation; and
   removing ballast from the floating foundation to increase the buoyancy of the floating foundation while the lifting equipment continues to lower the wind turbine generator component onto the floating foundation,
   wherein the predetermined vertical position of the floating foundation is substantially unchanged while the lifting equipment continues to lower the wind turbine generator component onto the floating foundation.

* * * * *